(12) United States Patent
Roehrs et al.

(10) Patent No.: US 6,357,929 B1
(45) Date of Patent: *Mar. 19, 2002

(54) FIBER OPTIC CONNECTOR HAVING AN ANNULAR-SHAPED FLOATING SEAL ASSEMBLY

(75) Inventors: Michael Roehrs, Dallas; Kerry W. Whitaker, Plano; Daniel Roehrs, McKinney, all of TX (US)

(73) Assignee: Fiber Systems International, Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/712,015

(22) Filed: Nov. 14, 2000

Related U.S. Application Data

(63) Continuation of application No. 09/440,025, filed on Nov. 12, 1999.
(60) Provisional application No. 60/119,227, filed on Feb. 9, 1999.

(51) Int. Cl.⁷ .................................................. G02B 6/38
(52) U.S. Cl. .............................. 385/59; 385/58; 385/70; 385/71
(58) Field of Search ........................ 385/55, 56, 58–60, 385/70–72, 76–78

(56) References Cited

U.S. PATENT DOCUMENTS

| | | | |
|---|---|---|---|
| 4,140,366 A | 2/1979 | Makuch et al. | 350/96.22 |
| 4,258,977 A | 3/1981 | Lukas et al. | 350/96.21 |
| 4,493,529 A | * | 1/1985 Doty | 385/69 |

(List continued on next page.)

FOREIGN PATENT DOCUMENTS

| EP | 0166 636 A1 | 1/1986 | ...................... 6/38 |

OTHER PUBLICATIONS

Derwent—Abstract for EP 0166 636 A1 EPC Application—EPC (cited above).
esp@cenet database—Abstract and two drawing sheets for EP 0166 636 A1—EPC (cited above).

*Primary Examiner*—Hemang Sanghavi
*Assistant Examiner*—Omar Rojas, Jr.
(74) *Attorney, Agent, or Firm*—Howison, Chauza, Thoma, Handley & Arnott, L.L.P.

(57) ABSTRACT

A fiber optic cable connector (12) is provided for connecting the terminal ends (302) of optical fibers (214) of fiber optic cables. The terminal ends (302) of the optical fibers (214) are mounted within termini (34) which are aligned for transmitting light signals therebetween. The connector (12) includes a housing (14) having bores (188) within which the termini (34) are mounted in a gimbaled arrangement, with gimbal points (306) being disposed distally from respective mating planes (304) between opposing terminal ends (302) of the termini (34) such that the termini (34) are pivotally moveable about the gimbal points (306). Floating seal assemblies (252) extend around respective ones of the termini (34) between the mating planes (304) and the gimbal points (306), and seal between the respective ones of the termini (34) and the bores (188) of the connector housing (14). The floating seal assemblies (252) each include an annular-shaped, floating collar (254) having an aperture (248) through which a respective one of the termini (24) extends. The termini (34) are free to move within respective ones of the apertures (248) of the floating collars (254), transverse to the longitudinal axes (220) of respective ones of the termini (34). The floating collars (254) each include a seal surface (258), which is preferably cylindrical and faces exteriorly of the collar (254), and a seal face (260), which preferably extends transverse to the longitudinal axis (220) of the respective termini (34). First seal elements (268) sealingly engage between the cylindrically-shaped seal surfaces (258) of the floating collars (254) and the bores (188) of the housing (14) of the connector (12). Second seal elements (266) seal between respective ones of the seal faces (260) of the floating collars (254) and shoulders (262) of the respective termini (34).

24 Claims, 8 Drawing Sheets

U.S. PATENT DOCUMENTS

| | | |
|---|---|---|
| 4,595,839 A | 6/1986 | Braun et al. ................. 250/551 |
| 4,878,730 A | 11/1989 | Wall ............................. 385/56 |
| 5,064,268 A | 11/1991 | Morency et al. .............. 385/87 |
| 5,280,556 A | 1/1994 | Jones ........................ 385/139 |
| 5,283,848 A | 2/1994 | Abendschein et al. ........ 385/59 |
| 5,394,494 A | 2/1995 | Jennings et al. .............. 385/58 |
| 5,590,229 A | 12/1996 | Goldman et al. ............. 385/59 |
| 5,608,828 A | 3/1997 | Coutts et al. ................. 385/59 |
| 5,796,896 A | 8/1998 | Lee ............................. 385/59 |
| D412,312 S | 7/1999 | Myers ...................... D13/146 |
| D424,020 S | 5/2000 | Fisher ...................... D13/146 |
| 6,206,579 B1 | 3/2001 | Selfridge et al. .............. 385/60 |
| 6,234,693 B1 | 5/2001 | Waldron et al. .............. 385/78 |

\* cited by examiner

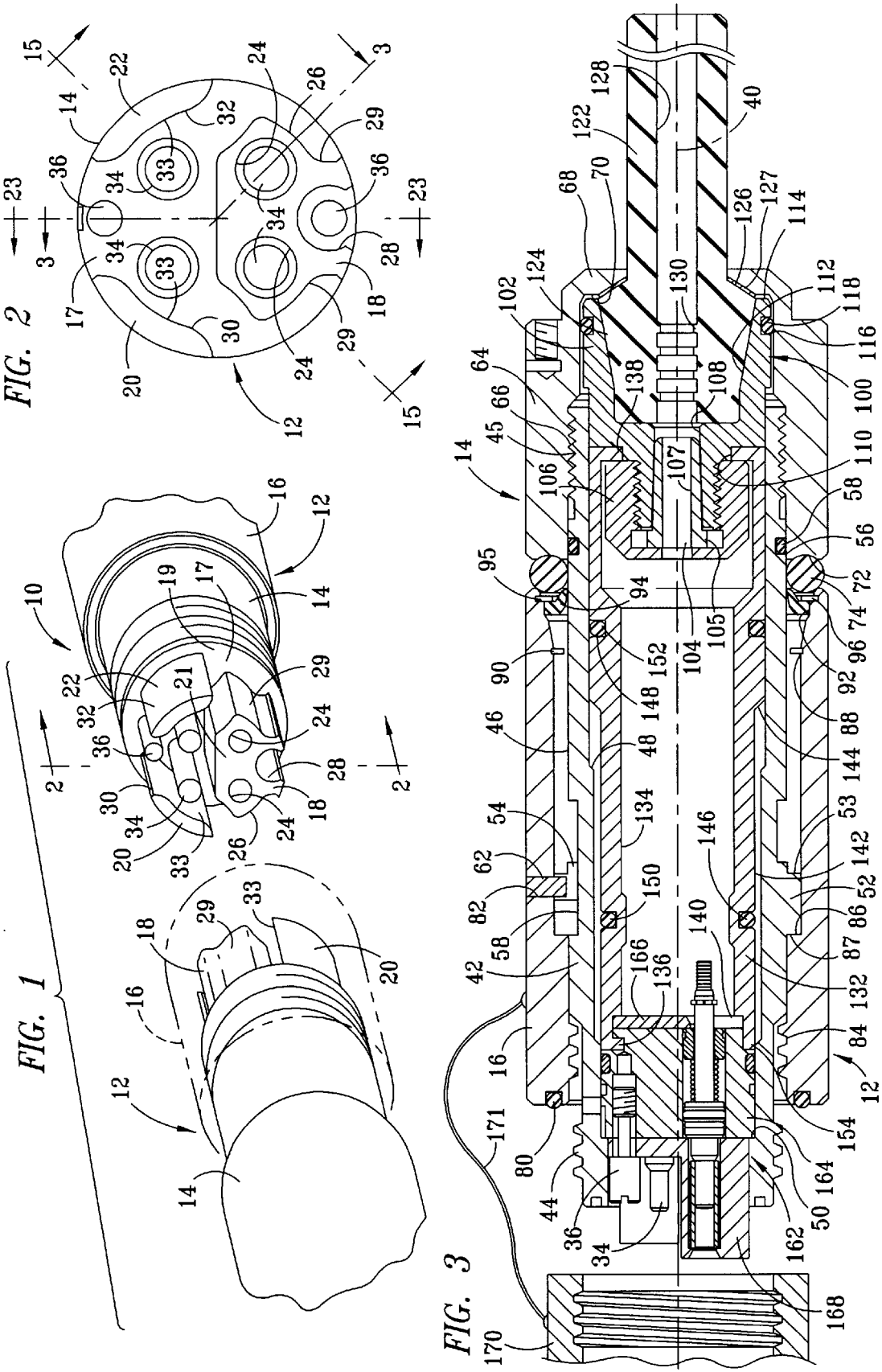

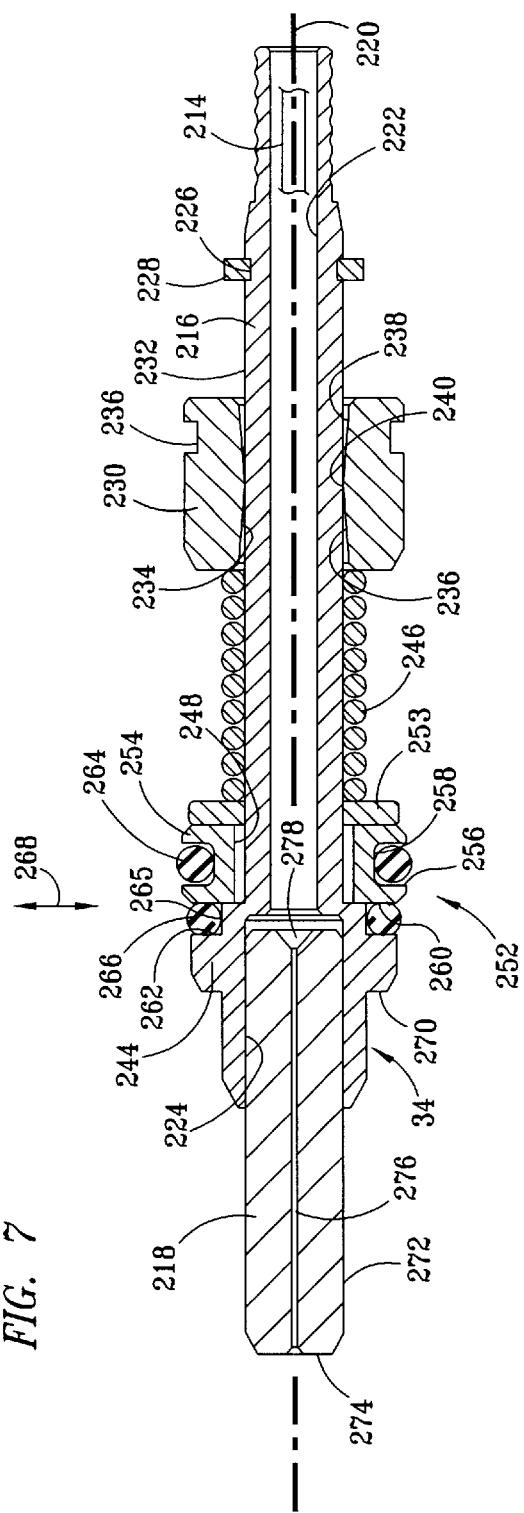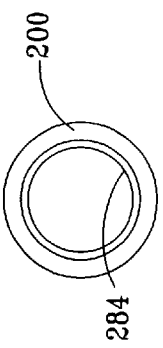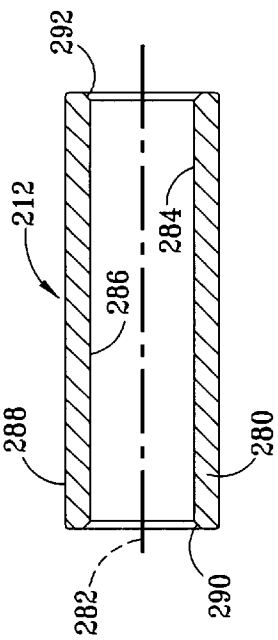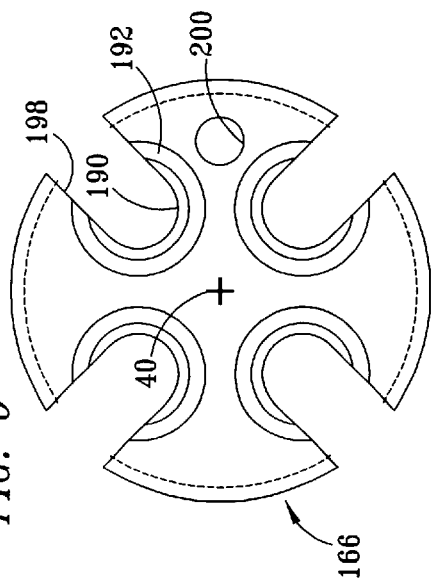

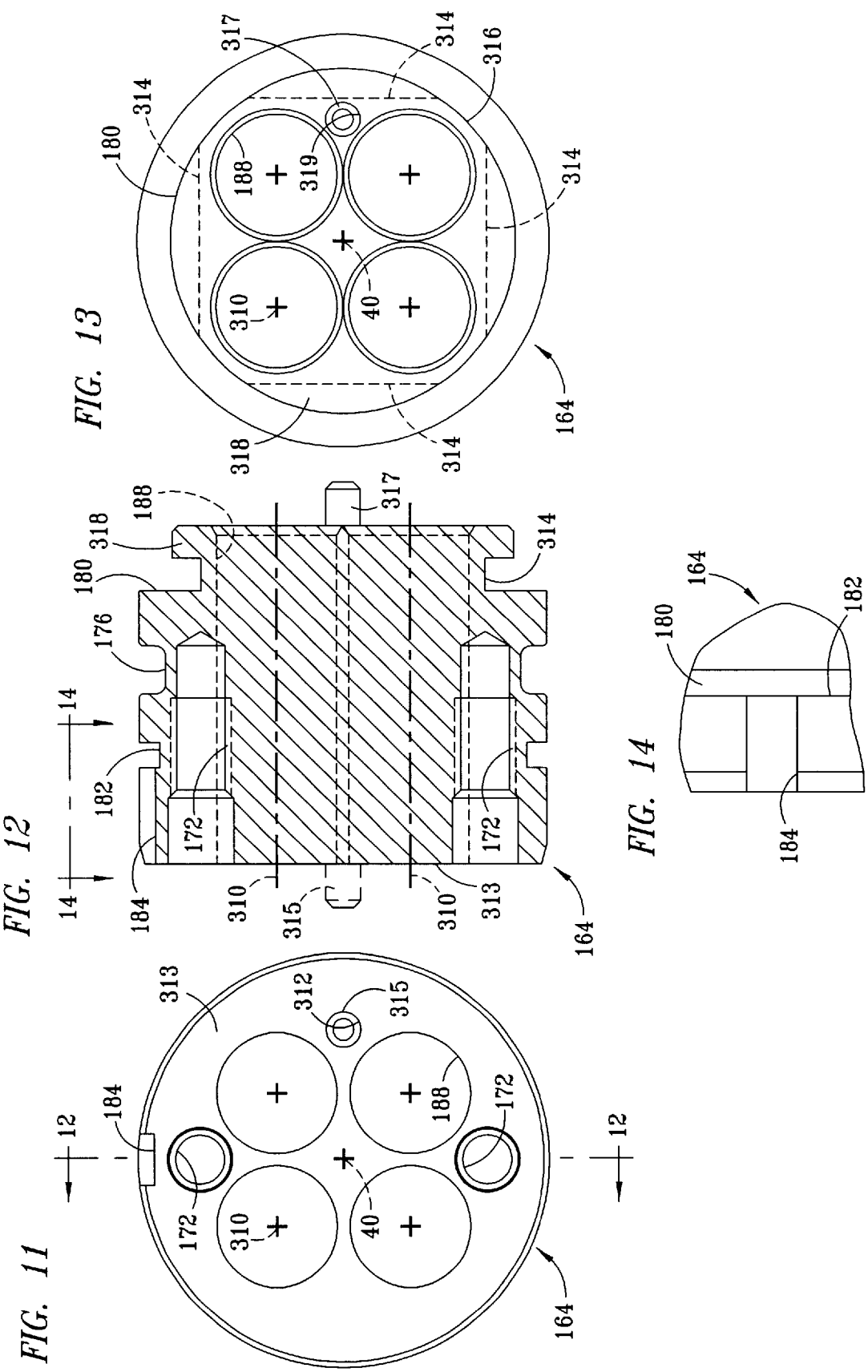

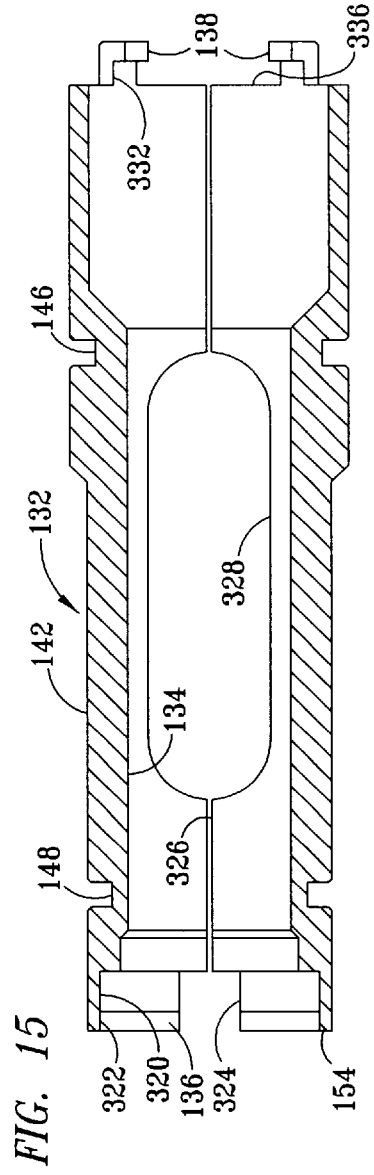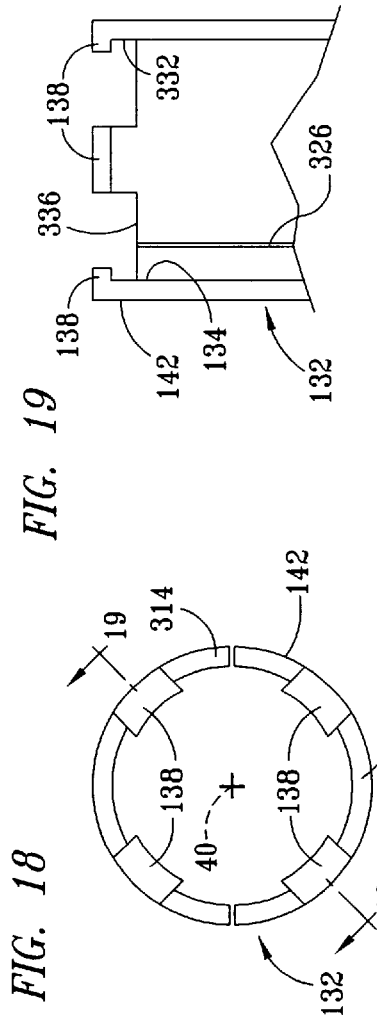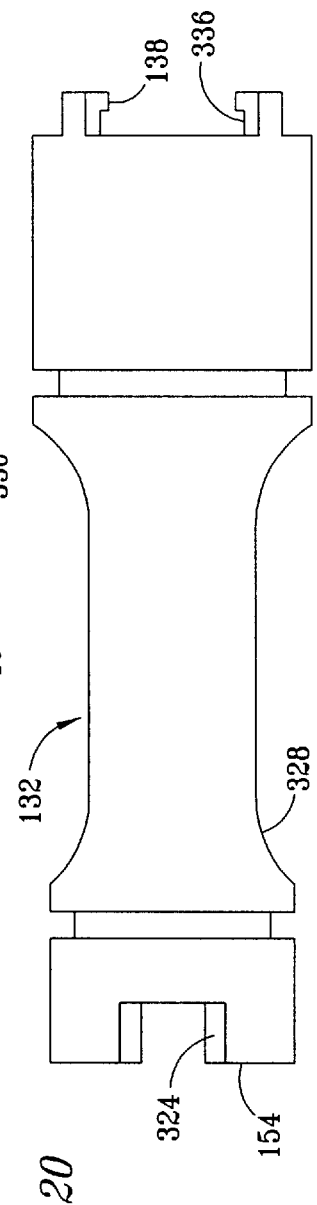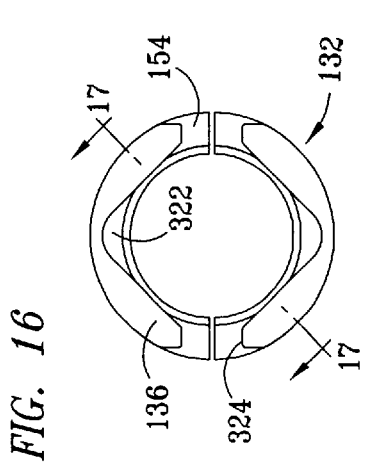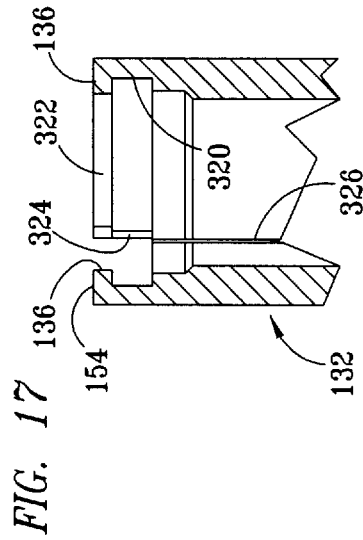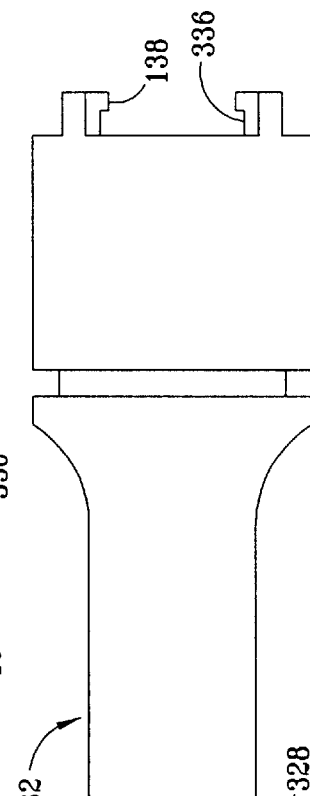

FIBER OPTIC CONNECTOR HAVING AN ANNULAR-SHAPED FLOATING SEAL ASSEMBLY

CROSS REFERENCE TO RELATED APPLICATION

The present application is a continuation of U.S. patent application Ser. No. 09/440,025, filed Nov. 12, 1999, which is continuation-in-part of, and claims priority to, U.S. Provisional Patent Application Ser. No. 60/119,227, filed Feb. 9, 1999, both entitled "FIBER OPTIC CONNECTOR" and invented by Michael Roehrs, of Dallas, Tex., Kerry Whitaker, of Plano, Tex. and Daniel Roehrs, of McKinney, Tex.

TECHNICAL FIELD OF THE INVENTION

The present invention relates in general to optical fiber light transmission systems, and in particular to connectors for use in coupling optical fiber conductors together.

BACKGROUND OF THE INVENTION

Prior art fiber optic cable connectors have been provided for joining cables which contain optical fibers. The cables are coupled so that the optical fibers of the different cables are aligned for transmitting light signals therebetween. In some applications, the cable connectors are coupled and decoupled numerous times for temporary installations, and may also be exposed to contaminants such as moisture, dust, smoke and fumes. Such fiber optic connectors and cables have been provided for single-channel applications, in which only a single conductor fiber is coupled from each of matting cables, and multi-channel applications, in which each of the cables contains multiple conductor fibers which are coupled by mating connectors. Terminal ends of the optical fibers contained in such cables are included within termini. The termini typically include ferrules which extend over the terminal ends of the fibers and which are aligned to align the mating faces of the respective optical fibers being joined. The terminal end portions of the optical fibers pass through the ferrules, and usually fit flush with terminal ends of the ferrules. When two of the cables are coupled together, opposing ferrules are mated together in an abutting arrangement, with the terminal ends of the optical fibers coaxially aligned for transmitting light signals therebetween. The alignment between two of the mating ferrules is critical in order to eliminate transmission losses which occur due to diffusion and reflection of the light being transmitted from one optical fiber to another.

In some single channel and multi-channel applications, light signals have been transmitted between opposing optical fibers using expanded beam type termini connections, in which the light signal from a first one of the optical fibers is expanded, or spread apart, and then collimated upon exiting a terminal end of a first one of the mating termini, and then is received and collected by a second one of the termini to focus the light signal into a second one of the optical fibers. Expanded beam type termini connectors have encountered losses in excess of 3 db, which is unacceptable in some fiber optic applications. The ferrules of the expanded beam type optical fiber termini have been coupled utilizing split sleeves. The split sleeves are each split along one side by a slot that runs the fill longitudinal lengths of respective ones of the sleeves, typically parallel to the lengths of the optical fibers, so that the sleeve acts like a resilient, spring-like member to clamp down upon the exterior of the ferrules to align the two mating ferrules. The two mating termini are usually gimbaled at points which are spaced apart from the terminal ends thereof, such that the terminal ends of the termini are free to angularly move along arcuate paths which extend transversely to the longitudinal length of the sleeve and the light path. This allows the terminal ends of the termini, that is, the axes of the termini, and the optical fibers to be coaxially aligned when being fitted within the split sleeve. O-ring seals have been included to prevent contamination of the terminal ends surfaces of the termini. In some prior art connectors, O-ring seals have been used to seal against the respective ones of the termini, and also to simultaneously provide gimbal surfaces for allowing angular alignment of the axes of the termini, such that the terminal ends of the termini are aligned in parallel.

Connection of male and female fiber optic cables in the field requires that the connecting fiber optic cables be arranged such that respective male and female connector ends of the cables are aligned for mating. The termini in the connectors are usually designated pin or socket, and can be fitted with springs on one or both. The distinguishing feature between a pin and a socket is that an outer alignment sleeve is associated with the socket and remains associated with the socket during normal mate and demate of the connectors, in which a pin termini engages within a socket termini. The male and female connectors typically have a respective pin termini or socket termini, and the connectors are connected to opposite ends of the fiber optic cables. Longer fiber optic cables may be used to prevent the higher transmission losses for connections between the cables by requiring fewer cable connections. If one of the longer cables has been laid out in the wrong orientation for connecting to an adjacent cable, then that one of the cables has to be gathered and then laid out a second time or a special female-to-female or male-to-male connector adapter is required to join two adjacent ends of the cables. Additional handling of connector ends can result in contamination of the termini, and use of special connector adapters results in additional line losses from the added fiber optic connections. To overcome this problem, hermaphroditic fiber optic cable connectors have been used to provide identical cable ends which may be mated together, such that either end of a first cable may be connected to either end of a second cable. Hermaphroditic connectors allow the fiber optic cables to be laid out without regard to the orientation of the cables, and also reduce line losses by not requiring special cable adapters for different cable ends. However, the termini in such connectors still typically remain either pin or socket termini, that is, with an outer alignment sleeve associated with one or the other.

SUMMARY OF THE INVENTION

A fiber optic cable connector is provided for connecting the terminal ends of optical fibers of fiber optic cables. The terminal ends of the optical fibers are mounted within termini which are aligned for transmitting light signals therebetween. The connector includes a housing having bores within which the termini are mounted in a gimbaled arrangement, with gimbal points being disposed distally from respective mating planes between opposing terminal ends of the termini such that the termini are pivotally moveable about the gimbal points. Floating seal assemblies extend around respective ones of the termini between the mating planes and the gimbal points, and seal between the respective ones of the termini and the bores of the connector housing. The floating seal assemblies each include an annular-shaped, floating collar having an aperture through which a respective one of the termini extends. The termini are free to move within respective ones of the apertures of the floating collars, transverse to the longitudinal axes of the respective termini. The floating collars each include both a seal surface, which is preferably of a cylindrical shape and faces exteriorly of the collar, and a seal face, which preferably extends transverse to the longitudinal axis of the respective termini. First seal elements sealingly engage between respective ones of the cylindrically-shaped seal surfaces of the floating collar and the bores of the housing of the connector. Second seal elements seal between respective ones of the seal faces of the floating collars and shoulders of the respective termini.

BRIEF DESCRIPTION OF THE DRAWINGS

For a more complete understanding of the present invention and the advantages thereof, reference is now made to the following description taken in conjunction with the accompanying Drawings in which:

FIG. 1 is a perspective view of a hermaphroditic fiber optic cable coupling made according to the present invention.

FIG. 2 is a cross-sectional view of one of the connectors of the fiber optic cable coupling, taken along section line 2—2 of FIG. 1;

FIG. 3 is a longitudinal section view of the connector, taken along section line 3—3 of FIG. 2;

FIG. 6 is a rearward-end view of a terminus retainer of the connector;

FIG. 7 is a longitudinal section view of a terminus of one of the optical fibers of the connector, taken along section line 3—3 of FIG. 2 and shown in a compressed and mated state;

FIG. 8 is a sectional view of an alignment sleeve for joining together two adjoining termini of mating optical fibers, taken along section line 3—3 of FIG. 2;

FIG. 9 is a rearward-end view of the alignment sleeve;

FIG. 11 is a forward-end view of an insert body of the connector;

FIG. 12 a sectional view of the insert body, taken along section line 12—12 of FIG. 11;

FIG. 13 is a rearward-end view of the insert body;

FIG. 14 is a partial view of the top of the insert body, as viewed along section line 14—14 of FIG. 12;

FIG. 15 is a sectional view of a split sleeve of the connector, taken along section line 15—15 of FIG. 2;

FIG. 16 is a forward-end view of the split sleeve of FIG. 15, showing forward flanges which are defined on the forward end of the split sleeve;

FIG. 17 is a partial section view of the forward end of the split sleeve, taken along section line 17—17 of FIG. 16;

FIG. 18 is a rearward-end view of the split sleeve of FIG. 15, showing dogs which are separated by milled regions;

FIG. 19 is a partial sectional view of the rearward end of the split sleeve, taken along section line 19—19 of FIG. 18;

FIG. 20 is an elevation view of the split sleeve, after the sleeve has been rotated ninety degrees around a central, longitudinal axis thereof, from the position shown in FIG. 15;

DETAILED DESCRIPTION OF THE INVENTION

Figure 4:
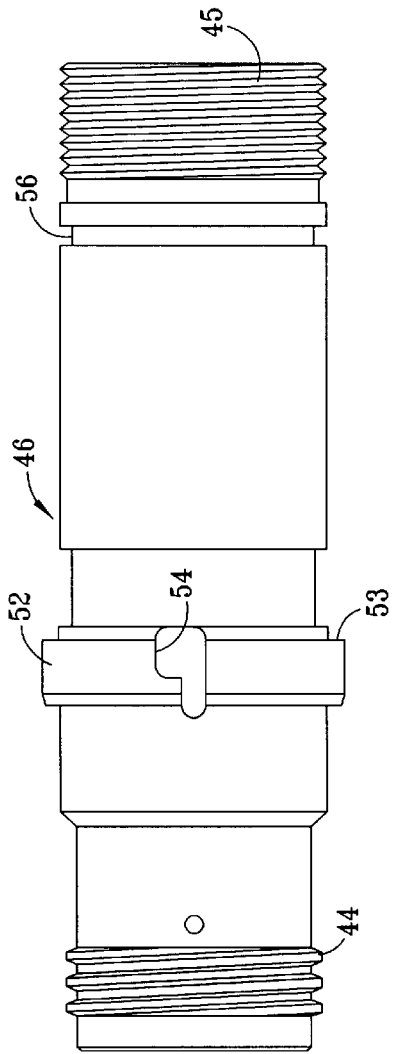
FIG. 4 is a top view of a sleeve which provides a main body housing of the connector.

FIG. 1 is perspective view of a fiber optic coupling 10 which includes two fiber optic connectors 12. Each of the fiber optic connectors 12 includes a connector housing 14, to which is threadingly secured a coupling sleeve 16. The fiber optic connectors 12 are hermaphroditic in that the mating connectors 12 are exact duplicates of one another, and the two identical connectors 12 mate with one another. The coupling sleeves 16 of each of the connectors 12 are threadingly secured to the connector housings 14 of respective ones of the connectors 12. The coupling sleeves 16 are selectively adjusted to make one of the mating connectors 12 correspond to a male connector and the other of the connectors 12 correspond to a female connector to dispose one in a male mode and the other in a female mode, respectively. The ends of the connector housings 14 of respective ones of the connectors 12 each include an insert cap 17, having three protuberant portions from which extend from a recessed face 19 of the insert cap to define a tower frame 18 and two tangs 20 and 22. The tower frame 18 defines an outwardly offset face 21, which is stepped outward of the recessed face of the insert cap 17. The three protuberant portions 18, 20 and 22 are arranged in an interlocking alignment with respective portions of a mating connector 12, such that the two tangs 20 and 22 are disposed in a keyed arrangement relative to the tower frame 18 for fitting on opposite sides of the tower frame 18 of the insert cap 17 of the mating connector 12. The tower frame 18 contains two apertures 24 for passing optical fibers, and a periphery 26 which defines a recess 28 and exteriorly disposed side profiles 29. The tang 20 has a periphery 30 and the tang 22 has a periphery 32, with each of the peripheries 30 and 32 defining interiorly facing profiles 33. The interiorly facing profiles 33 of the tangs 20 and 22 fit flush against mating contours of the exteriorly disposed side profiles 29 of the tower frame 18 of the insert cap 17. Two termini 34 of optical fibers are shown disposed in the region between the insert cap tower 18 and respective ones of the two tangs 20 and 22. A head of a screw 36 is shown extending within the same region. The recess 28 is fitted with a screw and is also is provided for receiving a second retaining screw 36 of a mating one of the connectors 12. Two termini 34 (not shown) are disposed within respective ones of the apertures 24.

FIG. 2 is a cross-sectional view of one of the connectors 12, taken along section line 2—2 of FIG. 1. Four of the termini 34 are shown for a four channel connector 12 of the preferred embodiment. The two retaining screws 36 are shown disposed at opposite sides of the face of the connector 12. The profile 29 of the periphery 26 of a first one of the connectors 12 has arcuately-shaped surfaces which are configured for matingly engaging with the profiles 33 of the peripheries 30 and 32 of respective ones of the tangs 20 and 22 of the other of the connector 12, for aligning the apertures 24 in the insert cap 18 of the first one of the connectors 12 with the termini 34 disposed adjacent to the tangs 20 and 22 of the second one of the connectors 12 for optically coupling the optical fibers of the two mating connectors 12. Preferably, the mating portions of the profile 29 of the plug bodies 18 define an exteriorly facing, arcuately shaped sidewall surfaces 26 which mate substantially flush with interiorly facing, arcuately shaped sidewall portions of the profiles 33 of the tangs 20 and 22, with a sliding clearance therebetween to allow the connectors 12 to be engaged and disengaged.

FIG. 3 is a longitudinal sectional view of one of the connectors 12, taken along section line 3—3 of FIG. 2. The connector 12 has a longitudinal axis 40. The connector housing 14 includes a sleeve 42 which provides a main connector body of the connector 12, and is of a cylindrical shape which is coaxially disposed with the longitudinal axis 40. The sleeve 42 has a threaded ends 44 and 45 for threadingly engaging the coupling sleeve 16 of a mating connector 12, and an end cap 64, respectively. The sleeve 42 has an exterior periphery 46 and an interior bore 48 which define two respective profiles for mating and coupling with other components of the connector 12. The sleeve 42 has an annular-shaped shoulder 50 which is interiorly disposed to extend within the interior bore 48, transverse to the longitudinal axis 40.

FIG. 4 is a top view of the main body sleeve 42. The exterior periphery 46 of the sleeve 42 includes an annular-shaped protuberance which defines a fib 52 having an annular-shaped shoulder 53 which extends transverse to the longitudinal axis 40. A slot 54 extends through the annular-shaped rib 52 to provide a window for passing a stop pin 62 through the rib 52, to selectively non-rotatingly coupling the coupling sleeve 16 to the main body sleeve 42 when the coupling sleeve is disposed in a male position. Then, the stop in may pass through the slot 54 to pass through the rib 52 for moving the sleeve 16 into a female position, rotatable upon the housing sleeve 42 for disposing the connectro 12 in a female mode for coupling to a mating connector 12 disposed in a male mode. A gland 56 is defined in the exterior periphery 46 for receiving an O-ring seal element 58.

Referring again to FIG. 3, the connector housing 14 further includes the end cap 64, which is secured to the rearward end of the main body sleeve 42 by a threaded connection 66. An annular-shaped lip 68 protrudes inwardly from the rearward-most end of the cap 64 and defines a shoulder 70. The forward end of the cap 64 has forwardly facing annular-shaped recess 72 which defines a seal surface for receiving an O-ring 74. The O-ring 74 acts as both a seal and a resilient spring when coupling sleeve 16 is pressed against it during connection mate-up.

The coupling sleeve 16 has an O-ring seal 80 on a forward end thereof. The coupling sleeve 16 also has a hole 82 which extends in a radial direction with respect to the longitudinal axis 40 of the connector 12. The stop pin 62 is press fit into the hole 82, and protrudes inwardly into the interior of the sleeve 16 for fitting into the L-shaped slot 54 through the annular rib 51 when the connector 12 is disposed in the male mode (shown in FIG. 3). The threads 84 are interiorly disposed on the forward end of the coupling sleeve 16. A rearwardly facing interior shoulder 86 is provided for engaging a forwardly facing end of an annular shoulder 87 of the main body sleeve 42 when the coupling 16 is disposed in a retracted position relative to the main body 42, which disposes the connector 12, as shown in FIG. 3, in a male connector mode in which the coupling sleeve 16 is disposed in the male position. When the coupling sleeve 16 is disposed in an extended position (shown in phantom for the left-connector 12 of FIG. 1) to extend forward of the sleeve 42, the coupling sleeve 16 is disposed in a female position; and the connector 12 is disposed in a female connector mode for coupling to a mating connector 12 which is disposed in a male connector mode (shown for the right-connector 12 of FIG. 1 and in FIG. 3) with the threads 84 of the coupling sleeve of the female mode connector 12 engaging the threaded end 44 of the main body sleeve 42 of the male mode connector 12. The pin 62 is removed from within the slot 54 through the annular-shaped rib 52, allowing the coupling sleeve 16 to move relative to the main body sleeve 42 such that the coupling sleeve 16 may be moved from the retracted, non-rotating position with the connector 12 disposed in the male mode, shown in FIG. 3, to an extended rotating position with the connector 12 disposed in a female mode, such as that shown for the left side connector 12 in FIG. 1.

An interior groove 88 is formed into the interior surface of the sleeve 16 for receiving a retainer ring 90. When the coupling sleeve 16 is moved to an extended position (see the left-connector 12 of FIG. 1 for the position of the sleeve 16), the retainer ring 90 abuts the rearwardly facing annular shoulder 52 of the main body sleeve 42, and the threads 84 of the sleeve 16 engage the threaded end 44 of a mating one of a sleeve 42 of a second connector 12 to which the connector shown in FIG. 3 is being connected. The rearward end of the coupling sleeve 16 further includes a recess 92 provided by an annular-shaped groove formed into the interior surface of the sleeve 16 within which a wiper seal 94 is disposed for extending therefrom for sealing engaging against the exterior periphery 46 of the main body sleeve 42. A groove 95 is provided for retaining a retainer ring 96.

A retainer assembly 100 includes a retainer body 102, a wedge member 104 and a threaded nut 106. The retainer body 102 is provided for interiorly disposing within the main body sleeve 42 and the cap 64. The shoulder 70 of the cap 64 retains the retainer body 102 within the sleeve 42. The exterior of the forward end of the retainer body 102 is threaded for engaging the nut 106 which, when tightened on the retainer body 102, causes the conically shaped wedge member 104 to be pressed against the tapered inner surface 108 of the retainer body 102. The wedge member 104 has a hexagonally shaped forward end 105 suitable for engaging with a wrench, which provides a means with which to loosen the wedge member 104 for removal. The wedge member 104 has a cylindrical hole 107 which extends axially through the body of the member 104 for the optical fibers to be routed through. The fiber optic cables used with the connectors 12 preferably include an outer jacket that covers inner members which usually include fiber elements made of a high performance fiber, such as an aramid fiber, such as KEVLAR™ or a high strength polyethylene fiber. When mounting the connector 12 to the terminal end of a fiber optic cable having multiple conductors, an end portion of the fiber sheath is entrapped between the wedge member 104 and the inner surface 108 in the forward end of the retainer body 102 to rigidly fasten the retainer body 102 and the connector 12 to the fiber optic cable. To remove the wedge member 104 from the retainer body 102 and from entrapping the end portion of the fiber elements between the wedge member 104 and the retainer body 102, the hexagonal end of the wedge member 104 is loosened to free the Kevlar entrapped by the wedging action.

A retaining groove 110 is provided in the exterior of the retainer body 102. A rearwardly facing, tapered opening 112 extends to an end shoulder 114. A seal gland 116 is formed into the outer periphery of the retainer body 102. A seal member 118 seals between the seal gland 116 and a surface of the cap 64. The seal member 118 is preferably an O-ring type seal member. The tapered opening 112 provides a seal surface which is engaged by a rubber seal boot 122. The rubber seal boot 122 includes a forwardly tapered conical surface 124, which slopes to narrow with respect to the longitudinal axis 40 in a forward direction. The seal boot 122 further has a rearwardly tapered profile 126 for engaging with the surface 70 of a conical washer 127 to energize the seal boot 122 to seal against the tapered opening 112 of the retainer body 102. The conical washer 127 is sandwiched between the rear cap 64 and the boot 122 and has the purpose of acting as a friction reducer element so that the rotation of the tightening action of nut 64 on the body sleeve 42 is not inhibited by the increasingly energized boot seal since there is relative slippage between the nut 64 and the conical washer 127. The conical washer does not typically rotate on the high friction rearward conical surface of the boot seal. The seal boot 122 further has a bore 128 for receiving a fiber optic cable, and an interior profile 130 with annular-shaped ribs for engaging against the outer jacket of a fiber optic cable.

A split sleeve 132 is mounted within the sleeve 42 of the connector housing 14. The split sleeve 132 preferably comprises two halves which are split in a longitudinal direction, parallel to the longitudinal axis 40. The split sleeve 132 includes an interior profile 134 which defines forward tabs 136 and rearward tabs 138, which provide coupling dogs. The rearward tabs 138 extend within the groove 110 of the retainer body 102. An interior groove 140 is formed into the forward end of the split sleeve 132. The periphery 142 of the split sleeve 132 has a shoulder 144 and seal glands 146 and 148. O-rings 150 and 152 are disposed in respective ones of the grooves 146 and 148, and are used as garter springs. The tabs 136 define a forward end 154 of the split sleeve 132. Two access windows 328 (shown in FIGS. 14 and 19) extend longitudinally in the split sleeve 132.

The connector housing 14 further includes an insert assembly 162 which is provided in the forward end of the connector 12. A rearward end of the insert assembly 162 has exteriorly extending protuberant lip portions that defines flats 314 which fit within the groove 140 of the forward end of the split sleeve 132, and interlock with the tabs 136 of the sleeve 132 to secure the assembly 162 to the sleeve 132. The insert assembly 162 includes an insert body 164, a terminus retainer 166 and an insert cap 168.

A dust cap 170 is provided for threadingly securing to the threaded end 44 of the sleeve 42. The cap 170 is secured to the connector 12 by a lanyard 171. In other embodiments, a plug may be provided for securing within the forward end of the sleeve 16, rather than the dust cap 170.

Figure 5:
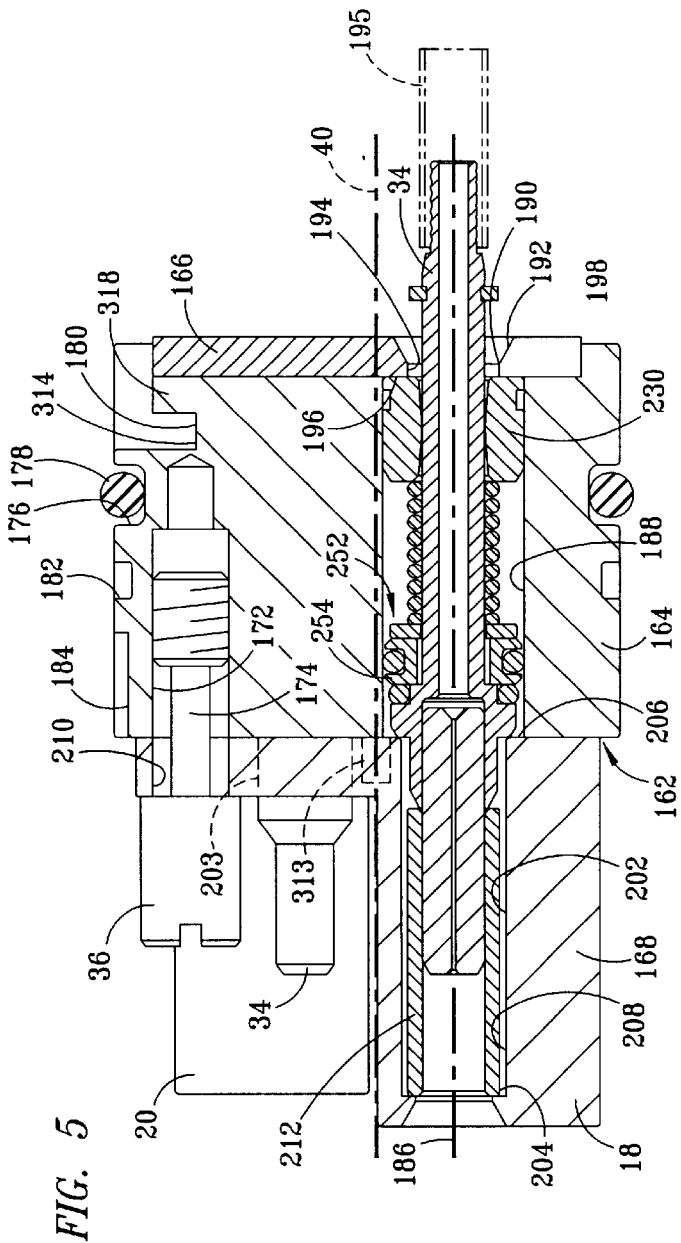
FIG. 5 is a longitudinal section view of a portion of the connector, taken along section line 3—3 of FIG. 2.

FIG. 5 is a longitudinal section view of the insert assembly 162, taken along Section Line 3—3 of FIG. 2. The two tangs 20 preferably extend for a shorter distance from the face 19 of the insert cap than the tower frame 18, as shown, providing clearances between opposing ones of the tangs 20 of the mating connectors 12. The screws 36 also preferably extend from the face 19 insert cap 168 for a shorter distance than the termini 34 to provide clearance between opposing ones of the screws 36 of the mating connectors 12. The insert body 164 has two threaded bores 172 (one shown) which are disposed 180° apart across the longitudinal axis 40, on opposite sides of the insert body 164. A threaded shank 174 of the two captive retaining screws 36 (one shown) extend within the threaded bore 172 to secure the insert cap 168 to the insert body 164. The two screws 36 may be removed from the hole 172, and then the insert cap 168 may be removed from the insert body 164. A seal gland 176 extends into an exterior periphery of the insert body 164 for receiving an O-ring seal element 178. An exterior profile 180 defines flats 314 and lip portions 318 (also shown in FIG. 13) that mate with the tabs 136 of the split sleeve 132 (shown in FIG. 3). Four bores 188 (one shown) extend through the insert body 164 for receiving respective ones of the termini 34.

The termini retainer 166 includes four bores 190 (one shown) and four slots 198 are shown) for entrapping the rearward ends of the termini 34 through respective ones of the bores 188. (See also FIG. 6). The bores 188 and 190 have longitudinal axes 186, which are parallel to the longitudinal axis 40. The rearward-most end of the bores 190 have a tapered surface 192, which widens in a rearward direction relative to the longitudinal axis 40. Forward portions 194 of the bores 190 provide cylindrical surfaces. The forward face 196 of the retainer 166 provides an annular retainer shoulder for retaining one of the termini 34 within the insert assembly 162. Each of the termini 34 is passed through a respective one of the slots 198 and into a respective ones of the bores 190, and then four of the termini are inserted together into respective ones of the bores 188.

Also shown on the rearward end of the termini 34 is a crimp sleeve 195 (shown in phantom). The crimp sleeve 195 is preferably used for installing the termini 34 to optical fiber cores when the termini 34 are uses in panel connectors, which mate with one of the cable connectors 12, and not when the termini 34 are used in the connectors 12 for connecting to the ends of fiber optic cables. When mounted with a panel connector, rather than to the end of a cable, the termini 34 are fastened to optical fibers within the panels by placing the high strength fibers, which extend around respective ones of the cores of the optical fibers, between the crimp sleeve 195 and the rearward end of the termini 34. Crimp grooves are formed into the rearward end of the termini 34, such that the crimp grooves extend circumferentially around the exterior periphery of the rearward end of the termini 34, and the high strength fibers are rigidly secured by crimping the crimp sleeve 195 against the crimp grooves with the high strength fibers therebetween.

The insert cap 168 includes two bores 202 (one shown) and two bores 203 (one shown) for receiving various ones of the termini 34. The shoulder 204 is provided in the forward end of the bore 202 for retaining an alignment sleeve 212 within the bore 202 of the insert cap 168. A rearwardly facing shoulder 206 of the insert cap 168 engages a forward facing portion of the terminus 34. The interiorly disposed surfaces of the bores 202 define interior profiles 208. Two bores 210 (one shown) are provided for receiving the shanks 174 of the retaining screws 36. The bores 202 and 203, and the bores 210 align with respective ones of the bores 188 and 172 of the insert body 164.

FIG. 6 is a rearward-end view of the terminus retainer 166. The terminus retainer 166 has the four bores 190 and the tapered portions 192. Four slots 198 extend from the edges of the outer periphery of the retainer 166 and connect with the bores 190, for sliding the pin bodies 216 of the termini 34 into the bores 190. The four bores 190 and the four slots 198 are each angularly displaced equal angular distances around the longitudinal axis 40, preferably having center lines which are ninety degrees apart. The four slots 198 are angularly disposed around the axis 40 such that they align with respective ones of the bores 190, and preferably have widths which are the same size as and align with the diameters of the bores 190. An alignment hole 200 is provided for receiving an alignment pin 317 (shown in FIG. 12) to prevent rotation of the terminus retainer 166 relative to the insert body 164. The terminus retainer 166 is held against the insert body 164 by a forward facing shoulder defined by a groove 320 formed into the split sleeve 320 (shown in FIG. 15).

FIG. 7 is a longitudinal section view of one of the termini 34, taken along section line 3—3 of FIG. 2, and shown after being compressed by the terminus retainer 166 (shown in FIG. 5). The one of the termini 34 is shown mounted on the terminal end of an optical fiber 214, and includes a pin body 216 and a ferrule 218. Each of the termini 34 has a longitudinal axis 220 which preferably extends substantially parallel to the longitudinal axis 40 of the connector 12 (shown in FIG. 3). The pin body 216 has a longitudinally extending bore 222 and a forwardly disposed counter bore 224, which are concentric with the longitudinal axis 220. The bore 222 is sized for receiving the optical fiber 214 and the clad which extends around the core defined by the fiber 214. The ferrule 218 is rigidly secured in the forwardly disposed bore 224. An annular groove 226 extends into an exterior surface of the pin body 216 for receiving a retaining ring 228.

A retaining collar 230 is secured around an exterior 232 of the pin body 216. The retaining collar 230 is secured in the bore 188 of the insert body 164 by the terminus retainer 166. The retaining collar 230 has an inner profile 234 defined by a tapered surface 236 and a tapered surface 238, which each taper toward the center of the retaining collar 230, such that the surface 236 and the surface 238 are wider at the outward ends. A protuberance 240 extends interiorly within the retaining collar 230, disposed between the tapered surface 236 and the tapered surface 238. The annular-shaped protuberance 240 defines an annular-shaped gimbal ring surface. The gimbal surface defined by the annular protuberance 240 extends inward and against the exterior periphery 232 of the pin body 216, such that the pin body 216 may be angularly displaced relative to the retaining collar 230, pivoting about the point of contact between the annular-shaped protuberance 240 and the pin body 216. An annular-shaped rib 244 extends from the exterior periphery 232 on the forward end of the pin body 216. The forward end of the annular-shaped rib 244 defines a shoulder 270 which engages the rearward facing shoulder 206 of the insert cap 168 (shown in FIG. 5) to retain the termini 34 within respective ones of the bores 188 (shown in FIG. 5).

The ferrule 218 has a cylindrically-shaped periphery 272 and a forward contact surface 274. Preferably, the forward contact surface 274 of the ferrule 218 is slightly rounded in a central region, and has rounded edges with a sharper curvature on the edge than the slight of the central region. In other embodiments, the central region of the forward contact surface may be a fully planer surface. In some such embodiments, the surface of the central region may also be disposed at an angle, such as 10 degrees, to a plane that is perpendicular to the longitudinal axis 220. The ferrule has a central bore 276 for receiving the core of the optical fiber 214. A tapered entrance 278 is provided which tapers such that it widens as it in a rearward direction. A coil spring 246 extends around the exterior of the pin body 216, between the forward end of the retaining collar 230 and a rearward end of a floating seal 252.

The floating seal 252 includes an annular ring 253 and a floating collar 254 which slidably extend around over the pin body 216. The annular ring 253 is preferably a flat washer. In some embodiments, the annular ring 253 may be omitted, but is provided herein to prevent a spring 246 from jamming between the pin body 216 and the floating collar 254. The floating collar 254 is annular-shaped, and preferably has a U-shaped cross-section and an interior bore 248 which may move longitudinally along the pin body 216, parallel to the longitudinal axis 220. The movement of the floating collar 254 in a direction transverse to the longitudinal axis 220 is limited by both a clearance fit between the interior bore 248 and the periphery of the pin body 216, and the clearance between the outside diameter of the floating collar 254 and the bore 188 of the insert body 164 (shown in FIG. 5). The collar 254 includes a rearnvardly facing shoulder 256 and a cylindrical, exterior-facing seal surface 258. A forward face of the collar 254 defines a forwardly facing seal surface 260. A rearward facing shoulder of the annular-shaped rib 244 defines a seal surface 262. An O-ring seal element 264 sealingly engages between the seal surface 258 and one of the interior bores 188 of the insert body 164 (shown in FIG. 5). An O-ring seal element 266 sealingly engages between the seal surface 260 and the seal surface 262. The width of the seal gland, which is defined by the distances between the seal surfaces 260 and 262, is determined by the length of an annular-shaped shoulder 265 of the pin body 216, which determines the squeeze applied to the O-ring seal element 266. The collar 254 is preferably sized to have a predetermined clearance fit with the bore 188 of the insert body 164 (shown in FIG. 5), such that it is free to move for only a limited distance in radial directions 268 with respect to, or transversely to, the longitudinal axis 186 of the bores 188, as determined by the predetermined clearance between the bore 188 and the largest outer diameter of the collar 254. This limited distance determines the range of the squeeze applied to the O-ring 264, which seals between the bore 188 and the seal surface 258. The range of squeeze applied to the O-ring 264 determines the energization for the O-ring 264. The resilience of the O-ring 264, which is squeezed between the collar 254 and the bore 188, tends to center the floating collar 254 within the bore 188.

The spring 246 presses between the retaining collar 230 and the annular ring 253, and is shown in a compressed state after being compressed between the terminus 166 and the insert cap 164 (shown in FIGS. 3 and 5). The spring 246 presses the floating collar 254 against the O-ring 266, to squeeze the O-ring 266 between the seal surfaces 260 and 262 (shown in FIG. 7), thereby providing a biasing means for energizing the O-ring seal element 266. The forward end of the pin body 216 is free to move radially with respect to, that is, transversely to the longitudinal axes 186 of the bores 188 in the directions 268 for distances determined by the clearance between the bore 248 of the floating collar 254 and the pin body 216. Thus, the pin body 216 and the annular shaped rib 244 thereof may be moved in the transverse directions 268 relative to the longitudinal axis 220, with the exterior of the pin body 216 pivoting about a pivot point defined by the protuberance 240 of the retaining collar 230. The seal surface 262 defined by the rib 244 will thus move transversely to the longitudinal axis 220 and relative to the forwardly facing seal surface 260 of the collar 254.

FIG. 8 is a longitudinal section view of the alignment sleeve 212, taken along section line 3—3 of FIG. 2. The alignment sleeve 212 has a continuous, solid tubular body 280 which is preferably made of a rigid ceramic material, such as zirconia. In the preferred embodiment, the tubular body 280 is cylindrical and has a central axis 282. The alignment sleeve has a bore 284 which has an interior profile 286 for mating with the peripheries 272 of two of the ferrules 218, over the lengths of the ferrules 218 and the sleeve 212, for aligning the two ferrules 218 together for transmitting light between optical fibers disposed in the bores 276 of the two ferrules 218. The exterior periphery 288 is provided for mating with the profile 208 of a respective one of the four bores 202 of the insert cap 168. Preferably, the profile 286 of the alignment sleeve 212 and the periphery 272 of the ferrule 218 are cylindrical, but in other embodiments may be other mating shapes for aligning the ferrules 218 of abutting ones of the termini 34 for transmitting light therebetween. Similarly, the exterior periphery 288 of the alignment sleeve 212 and the profile 208 of the bores 202 which extend through the insert cap 168 (shown in FIG. 5) are also preferably cylindrical, but may also be provided with other mating shapes for aligning and retaining the alignment sleeves 212 relative to the bores 202 of the insert cap 168. The ends 290 and 292 of the bores 284 are beveled to guide contact surfaces 274 of the terminal ends of the termini 34 into respective ones of the bores 284.

FIG. 9 is a rearward-end view of the alignment sleeve 212 of FIG. 8. Preferably, a cross-section of the tubular body 280 of the sleeve 212 is continuous, such that the tubular body 280 does not having either longitudinal or circumferential splits extending in the body 280, wherein the periphery of tubular body 280 extends continuously around the longitudinal axis thereof. Thus, the continuous, ceramic, tubular body 280 of the alignment sleeve 212 is rigid, and will not easily expand or contract, exclusive of the elasticity of the material from which the alignment sleeve 212 is made, due to forces applied transverse to the central, longitudinal axis 282 of the interior bore 284 by the ferrules 218, or by static or shock forces applied transverse to the ferrules 218, as would prior art spring-type alignment sleeves having longitudinally extending slits in the sidewalls. That is, other than the elastic limits of the ceramic material from which the alignment sleeve 212 is made, the solid sleeve 212 will not expand as would a split sleeve made of spring steel.

Figure 10:
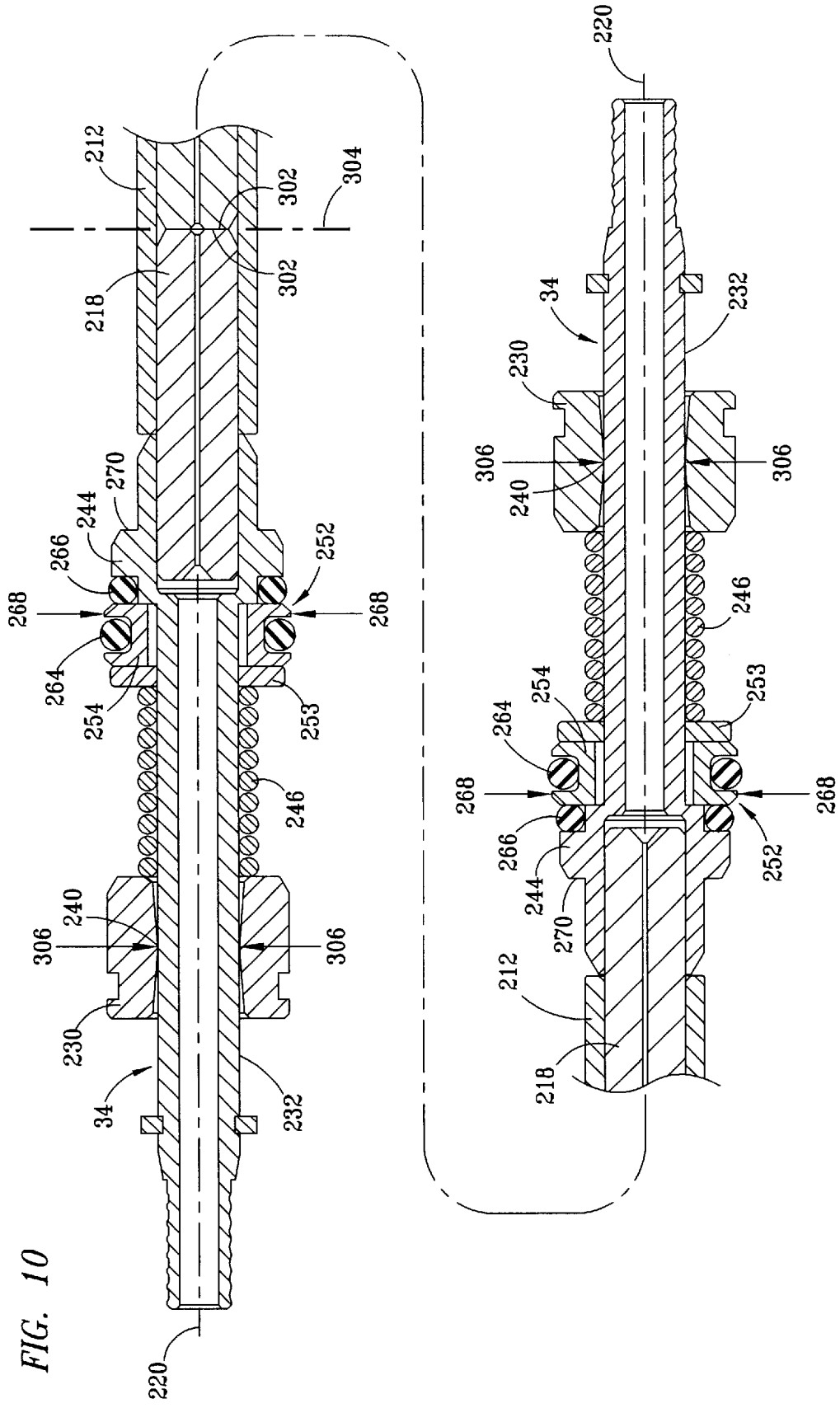
FIG. 10 is a longitudinal section view of two mating termini of mating optical fibers of the connectors, taken along section line 3—3 of FIG. 2.

FIG. 10 is a longitudinal section view of two of the termini 34 which are disposed in a coaxial and abutting alignment for transmitting light signals therebetween. Each of the optical fibers has terminal ends 302 which are aligned for transmitting light therebetween by engagement of respective ones of the ferrules 218 within the continuous alignment sleeve 212. The terminal ends 302 are aligned along a single plane of engagement, which is defined by an alignment of respective mating planes 304 of the terminal ends 302. The mating planes 304 fit flush against one another and extend transverse to respective ones of the longitudinal axes 220 of the termini 34. In other embodiments, the mating planes 304 may be at an angle to respective ones of the longitudinal axes 220. Respective ones of the termini 34 may pivot within the annular engagement points 306 of the gimbal rings provided by the protuberances 240 of the retaining collars 230. The exterior peripheries of the retaining collars 230 fit within the bores 188 in a sliding engagement. The retaining collars 230 are retained within the bores 188 of the insert body 164 (shown in FIG. 5) by the annular shoulder defined by the forward face 196 of the terminus retainer 166 (shown in FIG. 5). The forward ends of respective ones of the termini 34 are held within the bores 188 of the insert body 164 (shown in FIG. 5) by the shoulders 270, which are defined by the forward ends of the annular-shaped ribs 244, engaging the rearward facing shoulder 206 of the insert cap 168 (shown in FIG. 5). The termini 34 are gimbaled for pivoting relative to the contact points between the annular protuberances 240 of the retaining collars 230 and the exterior peripheries 232 of the pin bodies 216. The interior periphery of the alignment sleeve 212 mates with the exterior peripheries of the ferrules 218 of the termini 34, in a slight clearance fit which extends around the circumference of the ferrules 218 and along the lengths of the ferrules 218 and the alignment sleeve 212, which extend parallel to the longitudinal axis 220.

FIG. 11 is a forward-end view of the insert body 164. The four bores 188 are shown angularly spaced apart equal distances around the central axis 40, which is perpendicular to the plane of the view of FIG. 11. The flat 184 is formed into the top of the insert body 164, and extends parallel to the longitudinal axis 40 to provide a keyway. The two threaded bores 172 are spaced on opposite sides of the axis 40, and extend parallel to the axis 40. A mounting hole 312 extends into the forward end face 313 of the insert body 164 for receiving an alignment a pin 315 (shown in phantom) in the press-fit engagement. The alignment pin 315 extends for registering with and extending into a corresponding alignment hole 313 (shown in phantom FIG. 5) formed into the rearward face of the insert cap 168 to align the insert cap 168 with the insert body 164 and prevent rotation therebetween.

FIG. 12 is a sectional view of the insert body 164, taken along section line 12—12 of FIG. 11. The two threaded bores 172 are shown extending in a longitudinal direction into the insert body 164, parallel to the longitudinal axis 40. The threaded bores 172 only extend partially into, and not through, the insert body 164. The longitudinal axes 310 for the four bores 188 extend parallel to the longitudinal axis 40. A seal gland 176 extends circumferentially around the exterior periphery of the insert body 164, for receiving a seal member which is preferably an O-ring seal. The flat 184 extends into the outer periphery of the insert body 164. The flat 184 is also parallel to the longitudinal axis 40. Four flats 314 (two shown in FIG. 12) are formed into the insert body 164, with two of the flats 314 formed in parallel on the opposite sides of the periphery of the insert body 164. The flats 314 extend parallel to the longitudinal axis 40. Four lip portions 318 (two shown in FIG. 12) extend rearward of the flats 314, in a radially outward direction relative to the longitudinal axis 40. An alignment pin 317 extends rearward of the insert body 164 for engaging with an alignment hole 200 in the terminus retainer 166 (shown in FIG. 6) to prevent rotation of the terminus retainer 166 and the insert body 164.

FIG. 13 is a rearward-end view of the insert body 164. The four flats 314 (shown as hidden lines) are angularly spaced ninety degrees apart around the periphery of 164. The lengths of the flats 314 extend perpendicular to the longitudinal axis 40, and the widths of the flats 314 extend parallel to the plane of the rearward-end view of the insert body 164. Two of the flats 314 are formed into the periphery of the insert body 164 and extend perpendicular to the plane of the two flats 314 shown in FIG. 12. Rounded edge surfaces 316 are defined by the outermost periphery of the lip portion 318 disposed between adjacent ones of the flats 314. The lip portions 318 extend outward of the flats 314 of the outer profile 180 of the plug body 164. The four lips 318 are engaged by the tabs 136 on the forward end of the split sleeve 132 (shown in FIG. 3) to secure the insert body 164 to the split sleeve 132, and trap the outer edge of the terminus retainer 166.

FIG. 14 is a partial view of the top of the profile 180 of the insert body 164, as viewed along section line 14—14 of FIG. 12. The flat 184 is formed into the outer profile 180, defined by the exterior periphery of the insert body 164. The flat 184 extends from the forward end 313 of the insert body 164 to the groove 182, and parallel to the longitudinal axis 40 (shown in FIG. 11).

FIG. 15 is a longitudinal section view of the split sleeve 132, taken along section line 15—15 FIG. 2. The split sleeve 132 has an exterior periphery 142 into which glands 146 and 148 are formed. The split 326 extends through the split sleeve 132, parallel to the longitudinal axis 40. Two windows 328 (one shown) extend through the side walls of the split sleeve 132 to provide access ports for use in assembly of the split sleeve 132 with other components of the connector 12. A groove 320 has a circular shape and is formed into the forward end of the interior of the split sleeve 132, in part defining the interior profile 134 and a flange portion which defines the tabs, or dogs, 136. Outward of the groove 320 is a milled-out region 322, which is milled into the forward end 154 of the split sleeve 132.

FIG. 16 is a forward-end view of the split sleeve 132 showing forward flanges disposed on the forward end 154 of the split sleeve 132 to define the tabs, or dogs, 136. The tabs 136 extend inward toward center of the sleeve 132, from the groove 320 (shown in FIG. 15), between the milled-out regions 322 and the milled-out regions 324. The tabs 136 engage the flats 314 of the lip portions 318 of the insert body 164 (shown in FIGS. 12, 13 and 23).

FIG. 17 is a partial section view of the forward end 154 of the split sleeve 132, taken along section line 17—17 of FIG. 16. The milled-out region 324, the split 326 and the milled-out region 322 are shown extending into the forward end 154, to the groove 320, and together define the forward flanges 136.

FIG. 18 is a rearward-end view of the split sleeve 132. The dogs 138 are separated by the milled regions 336. Preferably, four dogs are provided with tabs 138 which extend inward from the outer periphery 142, are angularly spaced at equal angular distances around the longitudinal axis 40, and separated by the milled-out regions 336.

FIG. 19 is a partial sectional view of the rearward end of the split sleeve 132, taken along section line 19—19 of FIG. 18. The tabs 138 extend inward from the interior periphery 142 of the split sleeve 132. Milled regions 336 extend inward from the rearward end of the split sleeve 132 to define the tabs 138. The groove 332 of circular shape extends within the split sleeve 132 to define the interior profile 134 of the sleeve 132. The split 326 extends through two opposite sides of the body of the split sleeve 132.

FIG. 20 is an elevation view of the split sleeve 132, after the sleeve 132 has been rotated ninety degrees around the central axis 40 from the position shown in FIG. 14. The windows 328 extend into the sides of the split sleeve 132. The milled region 324 extends into the forward end 154. Two of the rearward tabs 138 are shown.

Figure 21:
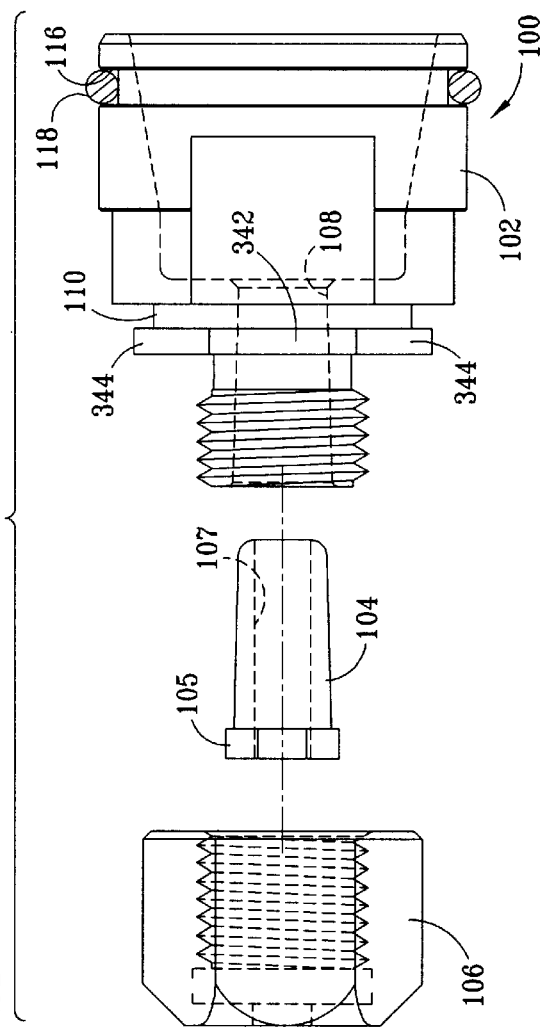
FIG. 21 is an exploded elevation view of a retainer assembly of the connector.

FIG. 21 is an exploded view of the retaining assembly 100. The forward end of the retainer body 102 is threaded for receiving the retaining nut 106, which retains the wedge member 104 within the retainer body 102. The retaining groove 110 has a circular shape and extends to an exterior periphery of the retainer body 102. The seal gland 116 has a circular shape and extends into the exterior periphery of the Kevlar retainer body 102.

Figure 22:
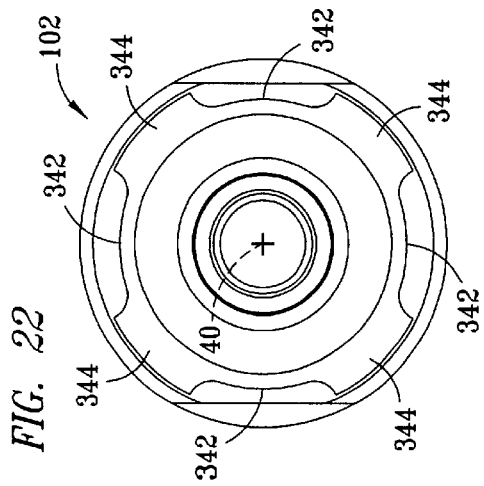
FIG. 22 is a forward-end view of the retainer assembly.

FIG. 22 is a forward-end view of the retainer body 102. Four milled regions 342 extend forward of the retaining groove 110. The milled regions 342 and the retaining groove 110 together define four tabs, or engagement dogs, 344. The four engagement dogs 344 are spaced equal angular distances apart around the central longitudinal axis 40 of the retainer body 102 for interlocking with the tabs 138 on the rearward end of the split sleeve 132, when the tabs 138 are located in the retaining groove 110. (See also FIGS. 15, 18 and 19).

Figure 23:
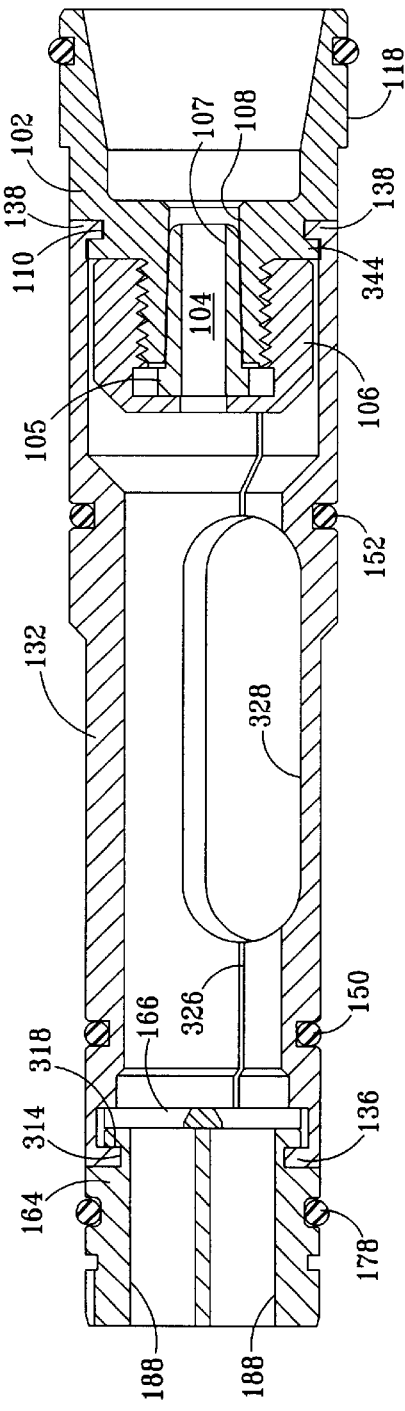
FIG. 23 is a sectional view of an assemblage of the insert body, the split sleeve and the retainer assembly, taken along section line 23—23 of FIG. 2.

FIG. 23 is a longitudinal section view of an assemblage of the insert body 164, the split sleeve 132, the retainer body 102 and the terminus retainer 166, taken along section line 22—22 of FIG. 2. The tabs 136 of the forward end 154 of the split sleeve 132 engage against the flats 314, and interlock with the retaining lip portion 318 of the insert body 164. The tabs 138 on the rearward end of the split sleeve 132 engage within the groove 110 to interlock with the engagement dogs 344 of the retainer 102. Once the split sleeve 132 is interlocked with the insert body 164, the terminus retainer 166 and the retainer 102, the entire assembly slides within the sleeve 42, and the seal rings 118 and 178 sealing engage therebetween. The seal rings 150 and 152 are O-rings which are used as garter springs to keep the two halves of the split sleeve 132 clamped together over the insert body 164, the terminus retainer and the retainer body 102.

Figure 24:
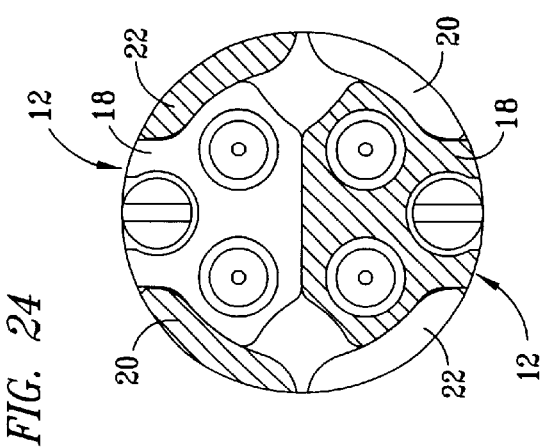
FIG. 24 is a cross-sectional view showing the engagement features for two of the fiber optic connectors after they have been coupled together, taken along section line 2—2 of FIG. 1 and showing a primary keying arrangement.

FIG. 24 is a cross-sectional view of the two fiber optic connectors after they have been coupled together, taken along section line 2—2 of FIG. 1. This view shows the relative positions of the insert cap tower 18 and the tangs 20 and 22 in the above-described keying arrangement shown in FIG. 2.

Figure 25:
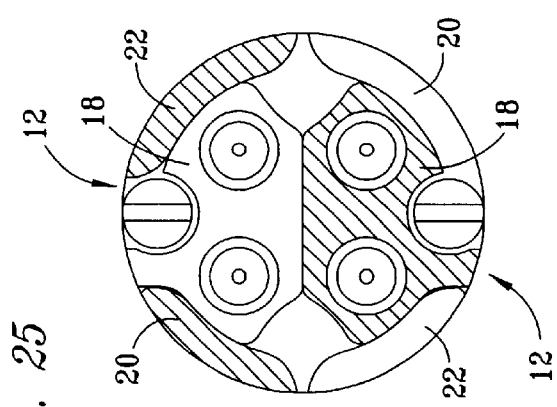
FIG. 25 is a cross-sectional view of a first alternative embodiment of two fiber optic connectors after they have been coupled together in a first alternative arrangement, as the view would appear if taken along section line 2—2 of FIG. 1.

FIG. 25 is a cross-sectional view of a first alternative keying arrangement for two fiber optic connectors 12, showing the connectors 12 as they would appear after being coupled together and taken along section line 2—2 of FIG. 1. The relative positions of the plug body 18 and the tangs 20 and 22 are shown for the first alternative keying arrangement.

Figure 26:
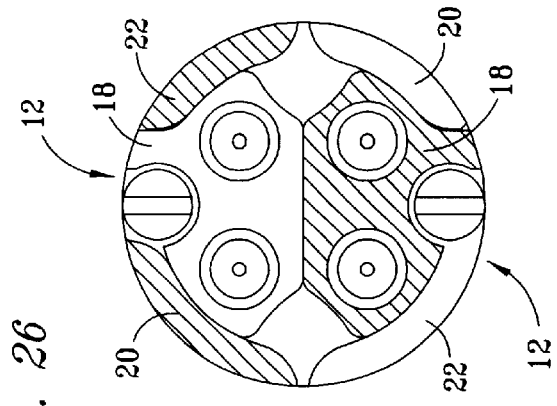
FIG. 26 is a cross-sectional view of a second alternative embodiment of two fiber optic connectors after they have been coupled together in a second alternative keying arrangement, as the view would appear if taken along section line 2—2 of FIG. 1.

FIG. 26 is a cross-sectional view of a second alternative keying arrangement for the two fiber optic connectors 12, showing the connectors 12 as they would appear after being coupled together and taken along section line 2—2 of FIG. 1. The relative positions of the plug body 18 and the tangs 20 and 22 are shown in the second alternative keying arrangement.

Preferably, the connector housings 14 and the coupling sleeves 16 are made of No. 6061 T6 aluminum. The termini 34 and the termini retainer are preferably made of No. 303 stainless steel. The springs 246 are preferably made of spring steel. The alignment sleeves 212 and ferrules 218 are preferably made of a rigid ceramic material, such as zirconia. Specifically the connector housing components can be enlarged to accommodate a larger number of channels positioned in a "mirrored" manner, thereby retaining the hermaphrodicity features of the connector.

Although the preferred embodiment has been described in detail, it should be understood that various changes, substitutions and alterations can be made therein without departing from the spirit and scope of the invention as defined by the appended claims.

What is claimed is:

1. A fiber optic cable connector for coupling to a mating fiber optic connector to align terminal ends of optical fibers of two fiber optic cables for transmitting light signals therebetween, the terminal ends of the optical fibers included within termini, and the connector comprising:

termini mounted to and including the terminal end portions of the optical fibers of the fiber optic cables, said termini having longitudinal axes and respective shoulders which extend transverse to said axes;

a housing having an interior passage disposed therein for receiving a respective one of said termini;

said housing having a shoulder disposed to extend into said passage, substantially transverse to a longitudinal axis of said passage for retaining said respective one of said termini within said passage;

a protuberance which extends inwardly within said interior passage, spaced apart from said shoulder and an end of said insert body, said protuberance fitting around a respective one of said termini to gimbal the respective one of said termini within said interior passage, such that said terminal end of said respective one of said termini may angularly move transverse to said longitudinal axis, pivoting about said protuberance;

an alignment member having an interior bore which receives an associated end portion of said respective one of said termini over a length which extends parallel to said respective one of said longitudinal axes of said termini, wherein mating ones of said termini fit within opposite ends of said interior bore to align said terminal ends of said mating ones of said termini for transmitting light signals therebetween a floating collar extending around said respective one of said termini with a clearance fit between said floating collar and said respective one of said termini such that said floating collar is free to move parallel to a respective one of said longitudinal axes corresponding to said respective termini;

a first seal surface defined on said floating collar, and extending exteriorly of said floating collar, such that a first seal gland is defined between said first seal surface and a surface of said interior passage, and said floating collar further having a seal face which extends transverse to said longitudinal axis of said respective termini, spaced apart from said respective shoulder of said termini to define a second seal gland therebetween;

a first seal element disposed within said first seal gland, and sealingly engaging between said respective termini and said surface of said interior passage of said housing; and a second seal element disposed in said second seal gland, extending around said longitudinal axis of said respective one of said termini, and sealingly engaging between said seal face and said respective shoulder of said termini, when said termini are angularly displaced about said protuberance.

2. The fiber optic cable connector of claim 1, wherein said floating collar has a U-shaped cross-section which faces outward to define said seal surface.

3. The fiber optic cable connector of claim 1, wherein said first and second seal elements are defined by O-rings.

4. The fiber optic cable connector of claim 1, wherein said respective shoulder of said one of said termini faces rearward and said seal face of said floating collar faces forward with respect to said fiber optic cable connector, and portion of said one of said termini extends rearward of said respective shoulders to space apart said seal face from said respective shoulder.

5. The fiber optic cable connector of claim 1, further comprising a biasing means for urging said seal face to sealingly engaging said respective shoulder.

6. The fiber optic cable connector of claim 1, further comprising said housing having a forwardly extending first insert cap defining a first tower frame, a first connector face and two first tangs, said first tower frame and said first tangs of said first insert cap extending forward of said first connector face, and wherein said two first tangs and said first insert cap are spaced apart in a keyed arrangement for receiving a second tower frame of a second insert cap of said mating fiber optic connector having, said second insert cap having said second tower frame and two second tangs, wherein said tangs fitting adjacent to said second tower frame and said second tangs fit adjacent to said first tower frame, such that with said first tower frame has a first tower frame end face which faces said second connector face and said second tower frame has a second tower frame end face which faces said first connector face.

7. The fiber optic cable connector of claim 6, wherein said first tower frame, said first tangs and said first connector face of said first insert cap are identically arranged to said second tower frame, said second tangs and said second connector face of said second insert cap to define a hermaphroditic fiber optic cable connector.

8. The fiber optic cable connector of claim 7, further comprising said housing have two spaced apart sets of exterior screw threads;

a coupling sleeve extending around said housing, said coupling sleeve having at least one set of interior screw threads for threadingly securing said coupling sleeve to said housing in first and second positions;

wherein when disposed in said first position, said coupling sleeve is secured to said housing in rearward position relative to said housing to dispose said connector in a male mode; and wherein when disposed in said second position, said coupling sleeve is secured to said housing in a forward position relative to said housing to dispose said connector in a female mode, such that said coupling sleeve is rotatable relative to said housing for threadingly engaging said mating fiber optic connector to secure said housing to said second mating fiber optic connector with mating termini aligned for transmitting light signals therebetween.

9. The fiber optic cable connector of claim 8, further comprising a pin which extends from said coupling sleeve into said housing to non-rotatably secure said coupling sleeve to said housing in said first position, wherein said connector is secured in said male mode.

10. A fiber optic cable connector for coupling to a mating fiber optic connector to align terminal ends of optical fibers of two fiber optic cables for transmitting light signals therebetween, the connector comprising:

termini mounted to and including the terminal end portions of the optical fibers of the fiber optic cables, said termini having longitudinal axes and respective shoulders which extend transverse to said axes;

a housing having a plurality of interior passages disposed therein for receiving a first set of said termini of the optical fibers associated with a first one of the two fiber optic cables in registration along a mating plane with respective ones of a second set of said termini of the optical fibers associated with a second one of the two fiber optic cables and the mating fiber optic connector;

said housing having a plurality of shoulders defined to extend inward within respective ones of said interior passages, spaced apart from said mating plane and substantially transverse to longitudinal axes of respective ones of said interior passages;

said housing further having a plurality of inwardly extending protuberances which extend inwardly within respective ones of said interior passages, spaced apart from said mating plane and respective ones of said shoulders of corresponding ones of said interior passages;

said protuberances fitting around respective ones of said termini to gimbal said termini within respective ones of said interior passages, wherein the terminal ends of the optical fibers associated with respective ones of said termini may angularly move with respect to respective ones of said longitudinal axes of said interior passages, pivoting about said protuberances;

alignment members having interior bores which receive associated end portions of said termini over lengths which extend parallel to respective ones of said longitudinal axes of said termini;

a plurality of floating collars, each of which is annular-shaped and extends around a respective one of said termini with a clearance fit between said respective ones of said floating collars and said termini such that said floating collars are free to move parallel to longitudinal axes of said respective termini;

said floating collars having seal surfaces which face outward from said floating collars and which extend parallel to said longitudinal axes of said respective termini, spaced apart from respective ones of said interior passages of said housing to define first seal glands therebetween;

first seal elements disposed in said first seal glands, extending around respective ones of said longitudinal axes of said respective termini, and sealingly engaging between respective ones of said seal surfaces and said interior passages when said termini are angularly displaced about said protuberances;

said floating collars having seal faces which extend transverse to said seal surface of said floating collar and parallel to said respective shoulders of said termini, said seal faces and said respective shoulders of said termini being facing, opposed surfaces which are spaced apart to define a second seal gland; and second seal elements disposed within respective ones of second seal glands, and sealingly engaging between said respective shoulders of respective ones of said termini and said seal faces of said floating collars.

11. The fiber optic cable connector of claim 10, wherein said floating collars have respective U-shaped cross-sections which face outward to define said seal surfaces.

12. The fiber optic cable connector of claim 10, wherein said first and second seal elements are defined by O-rings.

13. The fiber optic cable connector of claim 10, further comprising biasing means for urging said second seal faces of said floating collars to sealingly engage said respective shoulders of said termini.

14. The fiber optic cable connector of claim 10, wherein said respective shoulders of said termini face rearward and said seal faces of said floating collars face forward, and portions of said termini extend rearward of said respective shoulders to space apart said seal faces from said respective shoulders.

15. The fiber optic cable connector of claim 10, further comprising:

said housing having a forwardly extending insert cap, a connector face and two forwardly extending tangs, said insert cap extending forward of said connector face, and wherein said two tangs and said insert cap are spaced apart in a keyed arrangement for receiving a second insert cap of said mating fiber optic connector having two second tangs, said tangs fitting adjacent to the second insert cap, said insert cap fitting adjacent to the second insert cap and the second tangs and said connector face fitting against a forward face of the second insert cap;

said insert cap having two of said interior passages of said housing which define insert cap cavities within which are disposed respective ones of said termini; and said connector face having a second two of said interior passages of said housing which define two connector face cavities which are disposed between said insert cap and said tangs, from which respective ones of said termini extend.

16. The fiber optic cable connector of claim 15, further comprising two insert cap cavities that are aligned with two second connector face cavities of said second connector face of said second connector for receiving two of said termini therebetween, and said connector face cavities are aligned with two second plug body cavities of said second insert cap cavities for receiving a second respective two of said termini therebetween.

17. The fiber optic cable connector of claim 16, wherein said insert cap, said connector face and said tangs are identically arranged to said second insert cap, said second connector and said second tangs to provide a hermaphroditic fiber optic cable connector.

18. The fiber optic cable connector of claim 17, further comprising said housing having two spaced apart sets of exterior screw threads;

a coupling sleeve extending around said housing, said coupling sleeve having at least one set of interior screw threads for threadingly securing said coupling sleeve to said housing in first and second positions;

wherein when disposed in said first position, said coupling sleeve is secured to said housing in rearward position relative to said housing to dispose said connector in a male mode; and wherein when disposed in said second position, said coupling sleeve is secured to said housing in a forward position relative to said housing to dispose said connector in a female mode, such that said coupling sleeve is rotatable relative to said housing for threadingly engaging the second housing to secure said housing to said second housing with mating termini aligned for transmitting light signals therebetween.

19. The fiber optic cable connector of claim 18, further comprising a pin which extends from said coupling sleeve into said housing to non-rotatably secure said coupling sleeve to said housing in said first position, wherein said connector is secured in said male mode.

20. A method for joining two multi-channel fiber optic cables for transmitting light signals therebetween, comprising the steps of:

providing termini having longitudinal axes and which include terminal ends of optical fibers of the fiber optic cables, the termini including shoulders which extend substantially transverse to respective ones of the longitudinal axes;

providing floating collars which extend around the termini, the floating collars having seal surfaces and seal faces which face in respective directions;

providing first and second connector housings, each of the connector housings having a plurality of interior passages for receiving respective ones of termini of the optical fiber of the fiber optic cables, with the interior passages of respective ones of the first and second connector housings aligned for registering with respective ones of the interior passages of the other of the first and second connector housings;

mounting the floating collars around the termini, each of the floating collars mounted to a respective one of the termini, slidable in a longitudinal direction relative to the respective termini;

disposing first seal elements between the floating collars and the respective ones of the interior passages of the connector housings, sealingly engaging therebetween;

disposing second seal elements between the floating collars and respective ones of the termini, sealingly engaging between the seal faces of the floating collars and the shoulders of the termini;

mounting the termini within respective ones of the interior passages of the first and second connector housings, with the termini angularly moveable with respect to a gimbal point which is distally disposed from terminal ends of the respective ones of the termini, and the second seal element sealingly engaging between the floating collars and the interior passages of the housing as the termini are angularly moved within the respective ones of the interior passages;

slidably disposing respective ones of alignment sleeves within respective ones of the interior passages of the first and second connector housings, with respective ones of the termini disposed in each of the alignment sleeves; and mating the first connector housing with the second connector housing to slidably engage the termini of respective ones of the first and second connector housings within corresponding ones of the alignment sleeves to align the termini of the first and second connectors for aligning the terminal ends of the optical fibers of the optical conductors for transmitting light signals therebetween.

21. The method of claim 20, wherein the step of providing the shoulders of the termini and the seal faces of the floating collars, comprises providing the respective shoulders to face rearward and the seal faces of the floating collars to face forward, with respect to the first and second connector housings.

22. The method of claim 20, further comprising:

providing each of the first and second connector housings with respective ones of two coupling sleeves which extend around respective ones of the first and second connector housings and are threadingly securable thereto in at least first and second positions;

threadingly securing a first one of the two coupling sleeves to the first connector housing in the first position, wherein the first one of the two coupling sleeves is disposed rearward of a forward end of the first connector housing to dispose the first connector housing and the first one of the two coupling sleeves in a male mode; and then, threadingly securing a second one of the two coupling sleeves to the second connector housing in the second position, wherein the second one of the two coupling sleeves is disposed forward relative to the first position, to dispose the second connector housing and the second one of the two coupling sleeves in a female mode.

23. The method of claim 22, further comprising the step of latching the first one of the two coupling sleeves into the first position relative to the forward end of the first connector housing, to latch the first connector housing and the first one of the two coupling sleeves into the male mode.

24. The method of claim 23, further comprising the step of biasing the floating collars to urge the seal faces of the floating collar toward the respective shoulders of the termini to press the second seal there between.

* * * * *